UNITED STATES PATENT OFFICE.

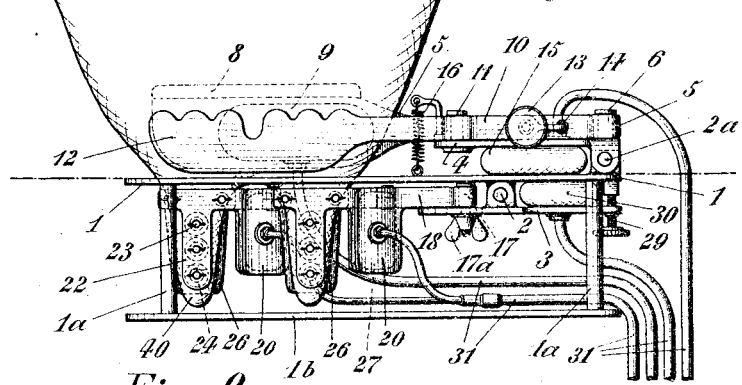

JOHANNES IGNAZ FRIEDRICH, OF DUSSELDORF, GERMANY, ASSIGNOR OF ONE-HALF TO JOHANNES GERHARDT, OF DUSSELDORF, GERMANY.

MILKING-MACHINE.

1,141,536.   Specification of Letters Patent.   Patented June 1, 1915.

Application filed December 29, 1914. Serial No. 879,501.

*To all whom it may concern:*

Be it known that I, JOHANNES IGNAZ FRIEDRICH, a subject of the German Emperor, and resident of 14 Kurfürstenstrasse, Dusseldorf, Germany, instructor, have invented certain new and useful Improvements in Milking-Machines, of which the following is a statement.

The present invention relates to a machine for milking the udder.

This machine operates essentially in such a manner that the milk is first moved from the filled glands into the cisterns and teats by the two udders being repeatedly stroked in a downward direction under pressure by the milking apparatus, after the udder has been previously stimulated by kneading, whereupon the discharging of the teats and cisterns and the milking of the udder is effected by a repeated compression and expression of the udder increasing with the progressing discharge and a downward stroking along the udder by the milking apparatus simultaneous with a rocking and kneading of the udders being produced, and lastly the teat milking apparatus being made to slightly squeeze down and out the teats, in order to completely discharge the latter and remove any drops of milk which may still adhere to the mouth of the teats.

In the accompanying drawing the said milking machine is exemplified in a constructional form.

Figure 5:
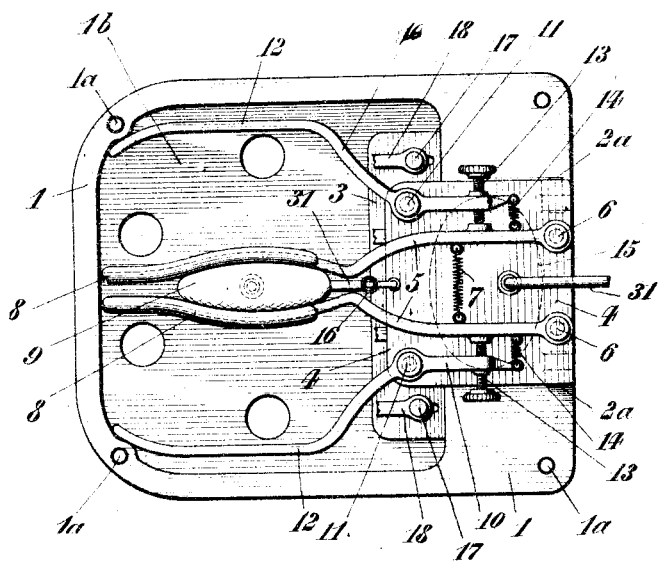
Figure 6:
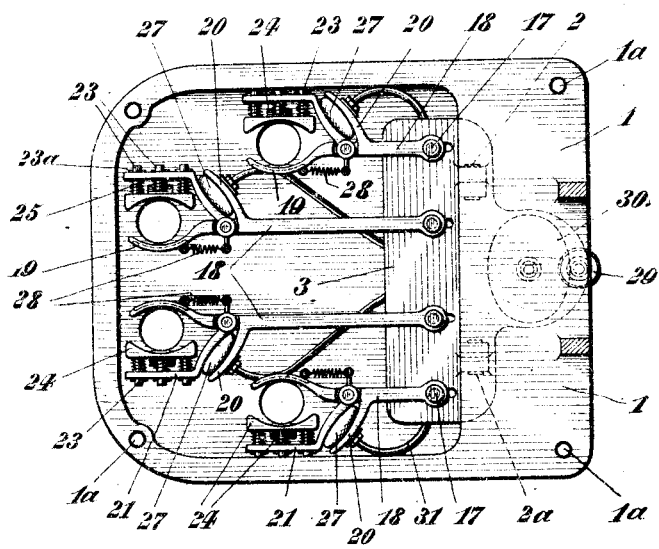

Figure 1 is a side elevation of the milking apparatus with the udder of the cow. Fig. 2 is a diagram showing an air-compressor with compressed air vessel and controlling gear for the compressed air. Fig. 3 is a side elevation and Fig. 4 is a front elevation of the teat milking apparatus. Fig. 5 is a plan of the udder milking apparatus, the teat milking apparatus having been omitted and Fig. 6 is a plan of the teat milking apparatus.

To a frame shaped main plate 1, which is rigidly secured by means of distancing bolts 1ª to a bottom plate 1ᵇ, are pivoted both above and below on pins 2 and 2ª the rocking plates 3 and 4, respectively.

To the upper rocking plate 4 are pivoted two levers 5 rocking on pins 6 in the plane of the plate, and drawn toward each other by a spring 7 fitted between them. To the ends of these levers 5 are fitted pressing plates 8 between which an air cushion 9 is provided which may be inflated by aid of compressed air. To the rocking plate 4 are further pivoted two double-armed levers 10 rocking in a plane parallel to the plate on pins 11; the longer arms of these levers 10 are, likewise, provided with pressing plates 12, while the shorter arms contain set screws 13 which are drawn by springs 14 toward the levers 5, the said springs 14 being attached to the ends of levers 10 and levers 5 respectively.

Between the main plate 1 and the rocking plate 4 is provided close to the pin 2ª an inflatable air-cushion 15 against which the rocking plate 4 is drawn by a spring 16 secured to the said rocking plate 4 and the main plate 1.

To rocking plate 3 are pivoted on pins 17 four arms 18 which may, by means of wing nuts 17ª screwed on the ends of pins 17 be secured in any adjusted position. The free ends of these four arms 18 carry each two fixed arms or members 19 and 20, between which a pivoted arm or member 21 is disposed. The arm 21 is made, at its end, in the shape of a plate 22, in which several pins 23, disposed over each other, are slidably fitted. On their inner ends these pins 23 are fitted with pressing plates 24, and also carry springs 25 which press the said plates 24 toward inside, or toward the arm 19, the travel of these pins being limited by pins 23ª in the ends of said pins. The arm 19 is curved at its end and provided with a plate 26. The pins 23 of the pressure plates 24 increase in length with each of the superimposed plates, and also the strength of the springs may increase in the same manner. Between the arms 20 and 21 are disposed inflatable air-cushions 27, against which press arms 21 by means of springs 28 which are secured to a pin on an arm 21 and to arm 19 respectively. The rocking plate 3, furthermore, has on its outer end a set-screw 29, which bears against the main plate 1, and between the two plates an inflatable air-cushion 30 is placed.

All air-cushions communicate by means of flexible tubes 31 with the cases 32 of piston-slides 33 which are reciprocated by means of eccentrics 34 fitted to a shaft 37. The cases 32 communicate with a compressed air vessel 35, which is supplied with compressed air from an air-compressor 36. The four air-cushions 27 communicate with the same case 32, while the other three air-cushions 9, 13, 30 communicate each with a separate case 32. By means of the piston slides 33 the compressed air passing to the air-cushions is controlled in such a manner, that it will enter in any desired manner and to any desired extent into the said air-cushions or may be let off from the same respectively.

In commencing the milking operation air is supplied and let off from the air-cushions 9 and 15 whereby the udder milking apparatus 8 and 12, respectively, which grip the udder halves from inside and outside, the plates 8 passing up between the udder and moving apart, are pressed several times against the halves of the udder and moved up and down by the rocking of plate 4. Then the teat milking apparatus 24, 26 are, by inflating of cushions 27 pressed repeatedly against the teats 40 between them, and likewise moved up and down by inflating and deflating the cushion 30. As, during this operation, the upper plates 24 are more forcibly pressed against the teats than the lower plates, the milk will be forced downward out of the teats. Then follows the clearing or after-milking by the plates 8 and 12 being repeatedly pressed in a more forcible manner against the udder halves and therewith moved up and down. Lastly the milk, which might still be contained in the teats is drawn off by means of the lower milking apparatus in the hereinbefore described manner, so that the teats are completely discharged and any drops of milk adhering to the mouth of the teats are removed.

The teat- and udder-milking apparatus are made of a light material and are so strapped by webbing passing over the back of the cow that they fit under the udder, while the other parts of the machine may be disposed in any suitable place. It is obvious that various changes may be made with respect to the construction of the above described machine without departing from the spirit of my invention.

I claim:

1. Machine for milking udders consisting of means movable in a horizontal and a vertical direction for operating on the teats and of means movable in a horizontal and a vertical direction for operating on the halves of the udder, which are gripped by the said means, means for operating said operating means.

2. Machine for milking udders consisting of means for operating on the udder and on the teats, levers, to which said means are fitted, rocking plates to which the said levers are pivoted, a main plate to which the said rocking plates are pivoted, means for operating the said rocking plates and means for operating the said levers.

3. Milking machine consisting of means for operating on the udder, a main plate carrying said udder-operating means, a rocking plate fitted to said main plate, means for operating said rocking plate, arms adjustably fitted to said rocking plate, at the end of each arm a fixed member, said member having at the top a curved section and below a plate, a movable member at the end of each arm, a plate on said movable member, several superimposed movable pressing plates on said plate, springs pressing said pressing plates toward the fixed member, and means for rocking said movable member.

4. Milking machine consisting of means for operating on the udder, a main plate carrying said udder-operating means, a rocking plate on said main plate, means for operating said rocking plate, arms adjustably fitted to said rocking plate, a fixed member at the end of each arm, said member having at the top a curved section and below a plate, a movable member at the end of each arm, a plate on said movable member, several superimposed movable pressing plates on said plate, springs adapted to press said plates toward the fixed member, said springs increasing in strength in an upward direction, and means for operating the movable member.

5. Milking machine, consisting of means for operating on the udder, a main plate carrying said udder-operating means, a rocking plate, on said main plate, means for operating said rocking plate, arms adjustably fitted to said rocking plate, at the end of each arm two fixed members, the one of said fixed members having above a curved section and below a plate, a movable member between the said two fixed members on the arm, on said movable member a plate, several superimposed sliding pins with pressing plates at their ends in this plate, on said pins springs of different strengths, which press the upper pins with their plates more strongly toward the fixed member with the plate than the lower pins, an inflatable air cushion between the movable member and the other fixed member, a spring pressing the movable member against the said aircushion.

6. Milking machine consisting of means for operating on the teats, a main plate carrying said teat-operating means, a rocking plate fitted to said main plate, an air cushion for operating said rocking plate, pivoting levers on said rocking plate, means at the ends of said levers for operating on the udder halves, and means for operating said levers.

In testimony whereof I have hereunto set my hand in the presence of two witnesses.

JOHANNES IGNAZ FRIEDRICH. [L. S.]

Witnesses:
 HELEN NUFER,
 ALBERT NUFER.